United States Patent Office 3,114,757
Patented Dec. 17, 1963

3,114,757
6-FLUORO-3,11-DIKETO-Δ$^{4,17(20)}$-PREGNADIEN-
21-OIC ACID ESTERS
Robert W. Jackson and John E. Pike, Kalamazoo, Mich., assignors to The Upjohn Company, Kalamazoo, Mich., a corporation of Delaware
No Drawing. Filed Sept. 22, 1961, Ser. No. 139,838
2 Claims. (Cl. 260—397.1)

This invention relates to certain novel 6-fluoro steroids, more particularly to 6-fluoro Favorskii esters of the formula:

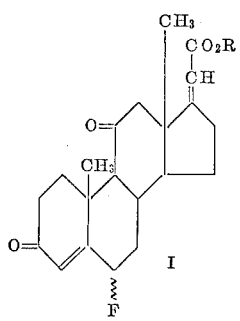

wherein R is an alkyl group containing from 1 to 8 carbon atoms, inclusive.

In this application the wavy line (∫) represents a generic expression including the alpha (α) and beta (β) configuration and/or mixtures thereof; and unless specifically designated as cis or trans, the configuration of the 21-carboxyl group attached to the double bonded C–20 carbon includes both the cis and trans configuration and/or mixtures thereof.

The novel compounds of this invention, the compounds of Formula I, are useful intermediates in the preparation of 6β-fluoro- and 6α-fluorohydrocortisone and 6β-fluoro- and 6α-fluoro-1-dehydrohydrocortisone, and the 21-acylates thereof.

In addition, the compounds of Formula I possess antiinflammatory, glucocorticoid, mineralocorticoid, progestational, androgenic, anabolic, anti-fertility and central nervous system regulating properties. Furthermore, the compounds of Formula I, when administered in the presence of potent androgens, e.g., testosterone, of potent estrogens, e.g., estrone, of potent progestins, e.g., progesterone, and of potent salt retainers, e.g., desoxycorticosterone, inhibit the hormonal effects of these materials. For example, the compounds of Formula I decrease the hormonal activity of the potent androgens, and thus exhibit anti-androgenic activity.

Administration of the novel steroids of Formula I can be in conventional dosage forms, such as pills, capsules, tablets, syrups or elixirs for oral use, or in liquid forms which are adaptable to the natural and synthetic cortical steroid hormones for injectable products. The novel steroids of Formula I can also be administered topically in the form of ointments, creams, lotions, and the like, with or without coacting antibiotics, germicides or other materials forming advantageous combinations therewith.

Moreover, the compounds of Formula I are useful ultra-violet screening agents. When used topically they absorb a portion of the erythema producing ultra-violet bands and at the same time permit the tanning ultra-violet bands to come through. Thus, they are useful ultra-violet screening agents in the tanning of human skin.

The novel compounds of Formula I and a process for their production can be illustrated by the following reaction scheme.

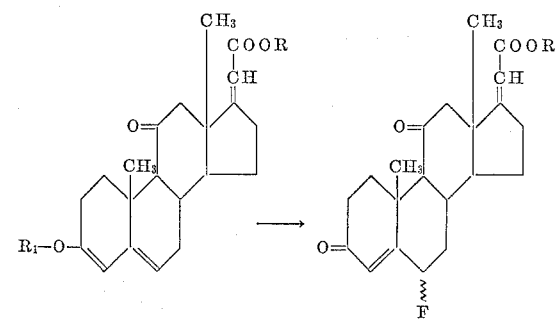

wherein $R_1$ is hydrocarbon, preferably lower-hydrocarbon, e.g., methyl, ethyl, benzyl, etc. and R has the meaning previously given, namely, lower alkyl, e.g., methyl, ethyl, propyl, isopropyl, butyl, isobutyl, tertiary butyl, hexyl, oxtyl, etc.

The starting steroids for the process of this invention are 3-alkoxy - 11 - keto-3,5,17(20)-[cis]-pregnatrien-21-oic acid alkyl esters, e.g., 3-ethoxy-11-keto-3,5,17(20)-[cis]-pregnatrien-21-oic acid methyl ester and 3-alkoxy-11-keto-3,5,17(20)-[trans]-pregnatrien-21-oic acid alkyl esters, e.g., 3-methoxy-11-keto-3,5,17(20)-[trans]-pregna-trien-21-oic acid methyl ester.

In carrying out the process of this invention, the selected 3-alkoxy - 11 - keto-3,5,17(20)-pregnatrien-21-oic acid alkyl ester, e.g., 3-ethoxy-11-keto-3,5,17(20)-[cis]-pregnatrien-21-oic acid methyl ester, is reacted with perchloryl fluoride, in the presence of a tertiary amine, to obtain the 3,11-diketo - 6 - fluoro-4,17(20)-pregnadien-21-oic acid alkyl ester, e.g., 3,11-diketo-6-fluoro-4,17(20)-pregnadien-21-oic acid methyl ester. The starting steroid is preferably employed in solution. Conveniently, this can be achieved by employing the selected amine as the reaction solvent. However, other inert organic solvents, e.g., diethyl ether, benzene, toluene, methanol, ethanol, chloroform, carbon tetrachloride, dimethylsulfoxide, dioxane, tetrahydrofuran, etc., can be employed as a diluent or solvent.

Ordinarily, it is preferred not to have a large excess of perchloryl fluoride in the reaction mixture, at least during the beginning of the reaction. Therefore, perchloryl fluoride is preferably bubbled into the solution of the steroid. Alternatively, it can be added as a solution in a suitable inert solvent. The amount of perchloryl fluoride employed in the reaction depends in part upon the reaction temperature and the selected starting steroid. Optimum yields of desired product are ordinarily achieved employing at least a molar equivalent of perchloryl fluoride, based on the starting steroid.

As is apparent to those skilled in the art, the tertiary amine employed in the process of this invention should be substantially non-reactive toward the perchloryl fluoride. The amines preferred for their non-reactivity are the hydrocarbon tertiary amines, either aromatic or aliphatic, e.g., trialkylamines, triethylamine, tributylamine, N-methylpiperidine and aralkylamines, e.g., benzyldimethylamine, dibenzylmethylamine, tribenzylamine. Especially preferred are the aromatic tertiary-N-heterocyclic amines. These amines are characterized by their amino nitrogen being a member of a >C—N=C< group which is part of an aromatic ring, and include the pyridines, e.g., pyridine, picoline, α- and β-lutidine, α-, β- and γ-collidine, propylpyridine, the parvolines, and quinoline, isoquinoline, pyridopyridine, napthyridine, etc. While any of these and like aromatic tertiary-N-heterocyclic amines can be used in the process of this invention, it is preferred to use the pyridine series, i.e., pyridine and its homologues, with pyridine being the amine of choice. At least a molar equivalent of amine, calculated on the perchloryl fluoride, is preferably employed, with a very large excess of the amine being ordinarily desirable, e.g., using the amine as a reaction solvent.

The reaction temperature can be varied considerably, e.g., from −75° to +100° C. without affecting the operability of the process. Generally, a temperature range of from −40° to +40° C. is preferred. For convenience, room temperature is often the desired reaction temperature, although somewhat lower temperatures sometimes give higher yields of the desired product.

3-enol ethers are well known in the art and may be readily prepared from the corresponding $\Delta^4$-3-keto steroid in a number of ways, e.g., by reaction of the $\Delta^4$-3-keto steroid with a lower-alkyl orthoformate in the presence of an acid catalyst, e.g., p-toluenesulfonic acid, sulfuric acid or methanesulfonic acid. See, e.g., Serini and Koster, Berichte, 71: 1766 (1938) and British Patent 737,773. The enol etherification can be conducted under conditions which will produce selectivity. Thus, the $\Delta^4$-3-keto group can be enol etherified without affecting the 11-keto group, ordinarily by merely running the etherification under mild conditions, e.g., as shown in the preparations hereinafter. The 3-ether radical is preferably hydrocarbon, e.g., lower-hydrocarbon, e.g., benzyl, p-methylbenzyl, lower-aliphatic, lower-alkyl, e.g. methyl, ethyl, propyl, butyl, amyl, hexyl, heptyl, and octyl.

The 3,11-diketo-6-fluoro-4,17(20)-pregnadien-21-oic acid alkyl ester, e.g., 3,11-diketo-6-fluoro-4,17(20)-[cis]-pregnadien-21-oic acid methyl ester, produced by the process of this invention can be isolated in the usual fashion, e.g., removing the reaction solvent and fractionally crystallizing, chromatographing, counter-currently extracting, or a combination of these procedures.

The process of this invention provides both 6α- and 6β-fluoro steroids. As is known in the art, 6β-fluoro-$\Delta^4$-3-keto steroids can be converted to 6α-fluoro-$\Delta^4$-3-keto steroids by bubbling anhydrous hydrogen chloride into a solution of the steroid in chloroform containing ethanol at about 0° C.

The following preparations and examples are illustrative of the process and products of the present invention.

PREPARATION 1

*3-Ethoxy-11-Keto-3,5,17(20)-[Cis]-Pregnatrien-21-Oic Acid Methyl Ester*

A mixture of 10.0 g. of 3,11-diketo-4,17(20)-[cis]-pregnadien-21-oic acid methyl ester, 1.0 g. of p-toluenesulfonic acid monohydrate and 100 ml. of ethyl orthoformate was heated under reflux for one hour and then evaporated to dryness at reduced pressure. The semicrystalline residue was recrystallized from a mixture of methanol and pyridine to give 8.1 g. of 3-ethoxy-11-keto-3,5,17(20)-[cis]-pregnatrien-21-oic acid methyl ester melting at 146–149° C.

Similarly, following the above procedure, but substituting the ethyl, propyl, butyl or octyl ester of 3,11-diketo-4,17(20)-[cis]-pregnadien-21-oic acid or 3,11-diketo-4,17(20)-[trans]-pregnadien-21-oic acid as the starting steroid, there is thus produced the ethyl, propyl, butyl and octyl ester of 3-ethoxy-11-keto-3,5,17(20)-[cis]-pregnatrien-21-oic acid or 3-ethoxy-11-keto-3,5,17(20)-[trans]-pregnatrien-21-oic acid.

Substituting propyl orthoformate for the ethyl orthoformate in the above reaction is productive of 3-propoxy-11-keto-3,5,17(20)-[cis]-pregnatrien - 21 - oic acid methyl ester.

In like manner, substituting propyl orthoformate for ethyl orthoformate in the above reaction and using 3,11-diketo-4,17(20)-[trans]-pregnadien - 21 - oic acid methyl ester as the starting steroid is productive of 3-propoxy-11-keto-3,5,17(20)-[trans]-pregnatrien - 21 - oic acid methyl ester.

PREPARATION 2

*3-Methoxy-11-Keto-3,5,17(20)-[Cis]-Pregnatrien-21-Oic Acid Methyl Ester*

To a slurry of 54 g. of finely ground 3,11-diketo-4,17(20)-[cis]-pregnadien-21-oic acid methyl ester in 325 ml. of absolute methanol and 75 ml. of methyl orthoformate was added with stirring 30 drops of concentrated sulfuric acid. The reaction product began to precipitate before all the starting material had dissolved. The mixture was stirred at room temperature for about 30 minutes, chilled for about 2.5 hours and the precipitate then separated and washed well with cold methanol to give 48.3 g. of 3-methoxy - 11 - keto-3,5,17(20)-[cis]-pregnatrien-21-oic acid methyl ester, M.P. 179–183° C., $$\lambda_{max.}^{EtOH}\ 235\ m\mu,\ a_M = 27{,}075$$

and having the correct elemental analysis.

Similarly, following the above procedure, but substituting 3,11-diketo-4,17(20)-[trans]-pregnadien-21-oic acid methyl ester for 3,11-diketo-4,17(20)-[cis]-pregnadien-21-oic acid methyl ester is productive of 3-methoxy-11-keto-3,5,17(20)-[trans]-pregnatrien - 21 - oic acid methyl ester.

EXAMPLE 1

*3,11-Diketo-6-Fluoro-4,17(20)-[Cis]-Pregnadien-21-Oic Acid Ester*

Perchloryl fluoride was slowly bubbled into a solution of 4.0 g. of 3-ethoxy - 11 - keto-3,5,17(20)-[cis]-pregnatrien-21-oic acid methyl ester in 200 ml. of pyridine at 0° to 5° C. for 5 minutes. The reaction mixture was then distilled to about half its original volume at reduced pressure and then poured onto ice and dilute hydrochloric acid. The resulting mixture was extracted with ether and the combined ether extracts were washed with aqueous sodium bicarbonate, dried and the residue dissolved in methylene chloride which was then chromatographed on 150 g. of magnesium silicate. The column wsa developed with 100-ml. portions of solvent of the following composition and order: 10 of hexanes plus 15% acetone and 10 of hexanes plus 20% acetone. Fractions 8 to 11 eluted 3,11-diketo-6α-fluoro - 4,17(20) - [cis]-pregnadien-21-oic acid methyl ester which was recrystallized from methanol to give 250 mg. of crystals melting at 224–226° C. (dec.). A second recrystallization from methanol raised the melting point to 226–228° C. (dec.). These crystals had the correct elemental analysis, $$\lambda_{max.}^{EtOH}\ 229\ m\mu,\ a_M\ 27{,}900;\ [\alpha]_D\ +178°$$

Fractions 13 to 16 eluted 250 mg. of 3,11-diketo-6β-fluoro-4,17(20)-[cis]-pregnadien-21-oic acid methyl ester which, when crystallized from methanol, melted at 155–160° C. (dec.). A second crystallization from methanol raised the melting point to 165–168° C. (dec.);

$$\lambda_{max.}^{EtOH}\ 227\ m\mu,\ a_M\ 23{,}100;\ [\alpha]_D\ +88°$$

EXAMPLE 2

*3,11-Diketo-6-Fluoro-4,17(20)-[Trans]-Pregnadien-21-Oic Acid Methyl Ester*

Perchloryl fluoride is slowly bubbled into a solution of 2.0 g. of 3-methoxy-11-keto-3,5,17(20)-[trans]-pregnatrien-21-oic acid methyl ester in 100 ml. of pyridine at 0° to 5° C. for 5 minutes. The reaction mixture is distilled in vacuo to about half its original volume and then poured onto ice and dilute hydrochloric acid. The resulting mixture is extracted with ether and the combined ether extracts are washed with aqueous sodium bicarbonate, dried, evaporated to dryness in vacuo, taken up in methylene chloride (25 ml.) and poured onto a chromatographic column containing 100 g. of magnesium silicate. The chromatographic column is developed by eluting with hexanes containing increasing proportions of acetone. The eluate fractions are freed of solvent and those early fractions having an ultraviolet absorption near 229 m$\mu$ are combined to give 3,11-diketo-6α-fluoro-4,17(20)-[trans]- pregnadien-21-oic acid methyl ester. Those later fractions having an ultraviolet absorption near 227mμ are combined to give 3,11-diketo-6β-fluoro-4,17(20)-[trans]-pregnadien-21-oic acid methyl ester.

In like manner, following the above procedure, but substituting other 3-alkoxy-11-keto-3,5,17(20)-[cis]-pregnatrien-21-oic acid alkyl esters and 3-alkoxy-11-keto-3,5,17(20)-[trans]-pregnatrien-21-oic acid alkyl esters, e.g., 3-ethoxy-11-keto-3,5,17(20)-[trans]-pregnatrien-21-oic acid methyl ester, 3-methoxy-11-keto-3,5,17(20)-[cis]-pregnatrien-21-oic acid methyl ester, 3-propoxy-11-keto-3,5,17(20)-[cis]-pregnatrien-21-oic acid methyl ester, 3-propoxy-11-keto-3,5,17(20)-[trans]-pregnatrien-21-oic acid methyl ester, and the ethyl, propyl, butyl and octyl esters of 3-ethoxy-11-keto-3,5,17(20)-[cis]-pregnatrien-21-oic acid and 3-ethoxy-11-keto-3,5,17(20)-[trans]-pregnatrien-21-oic acid, as the starting steroid for 3-methoxy-11-keto-3,5,17(20)-[trans]-pregnatrien-21-oic acid methyl ester, there is thus produced the corresponding 3,11-diketo-6-fluoro-4,17(20)-[cis]-pregnadien-21-oic acid alkyl esters and 3,11-diketo-6-fluoro-4,17(20)-[trans]-pregnadien-21-oic acid alkyl esters, e.g., the 6α- and 6β-epimers of 3,11-diketo-6-fluoro-4,17(20)-[cis]-pregnadien-21-oic acid methyl ester, 3,11-diketo-6-fluoro-4,17(20)-[trans]-pregnadien-21-oic acid methyl ester, and the ethyl, propyl, butyl and octyl esters of 3,11-diketo-6-fluoro-4,17(20)-[cis]-pregnadien-21-oic acid, and 3,11-diketo-6-fluoro-4,17(20)-[trans]-pregnadien-21-oic acid.

This application is a continuation-in-part of application Serial No. 830,463, filed July 30, 1959 and now abandoned.

We claim:
1. 3,11-diketo-6α-fluoro-4,17(20)-[cis]-pregnadien-21-oic acid methyl ester.
2. 3,11-diketo-6α-fluoro-4,17(20)-[trans]-pregnadien-21-oic acid, methyl ester.

References Cited in the file of this patent

UNITED STATES PATENTS

| | | |
|---|---|---|
| 2,818,408 | Campbell et al. | Dec. 31, 1957 |
| 2,899,448 | Beal et al. | Aug. 11, 1959 |
| 2,985,652 | Ringold et al. | May 23, 1961 |